United States Patent Office 3,204,972
Patented Sept. 7, 1965

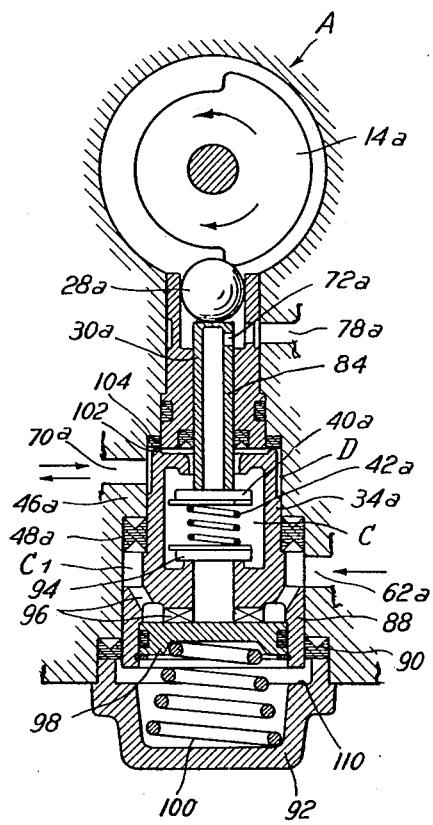

3,204,972
DEVICE FOR CONTROLLING THE ACTUATION OF LEVELLERS FOR A PNEUMATIC VEHICLE SUSPENSION
Giuseppe Alfieri and Roberto Moriondo, Milan, Italy, assignors to Fabbrica Italiana Magneti Marelli S.p.A., Milan, Italy, a corporation of Italy
Filed Jan. 30, 1964, Ser. No. 341,365
Claims priority, application Italy, Feb. 7, 1963, 2,437/63
11 Claims. (Cl. 280—6.1)

This invention relates to a device for automatically activating and disactivating the levellers used in a pneumatic vehicle suspension system.

These levellers are required to operate only when specific conditions occur in order to conform the pressure of the pneumatic suspension to the vehicle load when, for example, the vehicle is at rest.

There are some servo actuatable and auto-disactuatable levellers in which the actuation for controlling the pressure in the system as a function of the load is accomplished by the compressed air of the system which can be conveniently supplied or shut-off, for example, by means of a solenoid valve, as set forth in various patents, some of which were issued to the applicants of this application.

This invention is directed to a leveller device so designed that it supplies the system in correct relationship with the load carried by the vehicle.

A particular object of this invention is to keep the suspension efficient even when the supply pressure of the pneumatic system is approaching zero, due to breakage or leakage, by assuring in such a case a convenient and sufficient pressure to be supplied, thus enabling the vehicle to reach a repair shop, even though at a reduced speed, to make the necessary repairs.

The device, according to the invention, is applicable to levellers comprising a hollow pushrod actuated by the movable member of the leveller to engage, through the open end thereof, a spring-urged valve which in conjunction with said pushrod, controls the supply between the pneumatic suspension and either the pressure fluid source or the atmosphere. This device is characterized in that at least the spring valve of the leveller is retained by a piston which is biased by a fluid under pressure and by springing means and which slides within a respective cylinder, the two chambers of which are directly connected with the pressure source and the suspensions, respectively. This piston actuates a flow control member which controls the communication between said two chambers to actuate the leveller or not.

According to an advantageous embodiment of this device, the piston is axially bored and houses the spring valve, operated by the pushrod of the leveller, arranged in series to the flow control member, a portion of which is integral with said piston and the other is carried by the cylinder in which the piston slides. An advantage is obtained if the hollow piston retains in its interior in slidable relationship therewith the pushrod of the leveller by means of retaining members. According to another embodiment of the device, the hollow piston houses in its interior, in addition to the spring valve of the leveller, also another valve which controls the unidirectional flow between the pressure chamber and the chamber which is connected to the pneumatic suspension, whilst the bored pushrod is retained by a bush integral with the leveller body.

This invention will now be explained by the following specification with reference to the accompanying drawings which illustrate, by way of example, two embodiments of the device.

In the drawings:

FIGURE 3 shows in cross-section another embodiment of the device of FIGS. 1 and 2.

Figure 1:
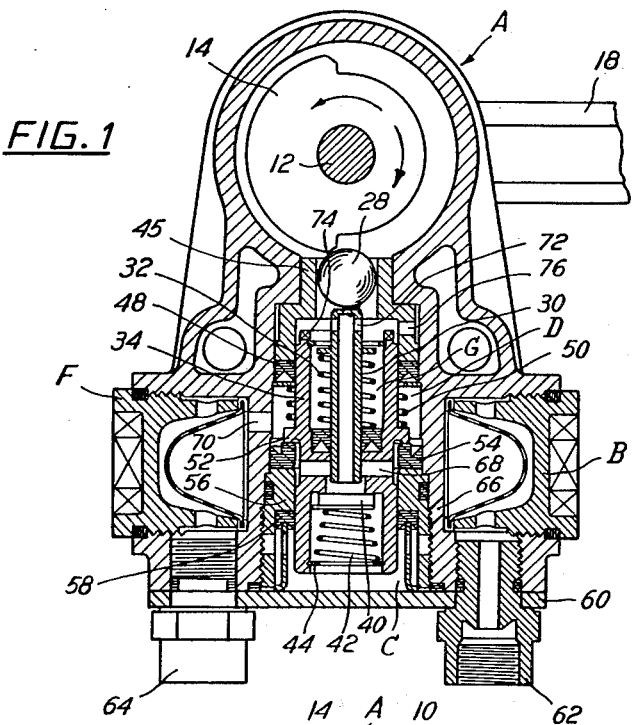
FIGURES 1 and 2 are cross-sectional views, at right angles to each other, of a leveller provided with the device of this invention in accordance with a first embodiment thereof.

In the several figures, similar parts are designated by like references. Considering now FIGURES 1 and 2, the leveller illustrated comprises, in a known way, a casing A which holds, by means of a bearing 10, a shaft 12 to which a cam 14, which has a symmetrical outline or profile, is keyed. The projecting end of said shaft is provided with teeth 16 for the adjustable engagement with a lever 18 which is locked in position by means of a bolt 20. Said lever is connected, in a known way, with the vehicle axle (or with the chassis or frame), whereas the casing A is secured to the frame (or to the axle). A spring 24 which is retained by a cover 26 placed behind casing A acts, through a ball 22, on the other end of shaft 12.

Cam 14 cooperates, through a ball 28, with the closed end of a pushrod 30 which, eventually, is urged by a spring 32, the springing action of which is conveniently limited. Said pushrod 30 is located within a hollow piston 34 and slides through a seal 36 retained by a collar 38 provided in the interior of said piston. The lower part of the collar 38 forms the seat for a check valve 40 urged by a spring 42 also located in the interior of the piston 34 and retained therein by a split ring or resilient segment 44.

Piston 34 is slidable within a cylinder fitted within the casing A of the leveller and which, in the case illustrated, is formed by bushes, one of which, indicated by 46, has a crown or upward projection 45 thereon which surrounds ball 28. The lower edge of bush 46 has a gasket or seal 48 pressed thereagainst by an end of a spring 50, the other end of which engages a flange 52 provided at the exterior of piston 34. The lower edge of said flange is conveniently shaped in order to constitute a sealing seat which cooperates with a gasket or seal 54 carried by the edge of a counter-bush 56 which in conjunction with bush 46, forms the cylinder for piston 34 which carries a gasket or seal 58 in its interior, said gasket cooperating with piston 34. The counter-bush 56 is secured to the body A by a cover 60 which is kept in place by means of a fitting connection 62 (which is connected to the pressure fluid reservoir through a filter B and a chamber C of the piston 34-cylinder 46-45 unit) and a fitting connection 64 (which is connected to the pneumatic suspension system).

Flange 52 and gasket 54 form a flow control member which is actuated by piston 34 and which controls the communication between the two chambers of piston-cylinder unit 45, 56, 34. In particular, such flow control member is arranged in series and downstream of the leveller valve 40.

Chamber C which is defined by piston 34 and counterbush 56 is connected through leveller valve 40 and radial bores or parts 68 machined in piston 34 at the upper part of valve 40, to an annular chamber D between bush 46 and counter-bush 56 constituting the other chamber of the piston-cylinder unit. Chamber D communicates, through a passage 70 and another filter F, with the fitting 64 leading to the pneumatic suspension system. Pushrod 30 is formed at the upper part thereof with radial bores 72 which lead to a chamber G within piston 34, which near its top is provided with slots 74 acting as air passages when said piston bears against the shoulder formed in the interior of bush 46 and crown 45. Said bush 46 is formed, in turn with bores 76 which place in communication said chamber G with free atmosphere through apertures 78 machined in the body A and by a disc-shaped dust-guard 80.

The operation of a pneumatic suspension system provided with the leveller containing the device of the application is the following, wherein the various conditions of such system will be considered.

(a) *Inactive or exhausted pneumatic system*

When the system is inactive, or when its pressure is lower than a predetermined limit, the leveller is at the position illustrated by FIGURE 1, where valve 40 is kept engaged against its seat by spring 42. Flow control member 52–54 is also closed, since spring 50 presses flange 52 of the piston 34 against gasket 54. The compressed air supplied through fitting 62, after having passed through filter B, flows into chamber C and, when its pressure reaches a predetermined value, piston 34 is pushed upwards against the action of spring 50 and its slotted end 74 engages with the abutment inside bush 46. This displacement of the piston 34 disengages flange 52, integral with said piston, from seal 54, and valve 40 by means of pushrod 30 is disengaged from its seat to thus establish communication between chambers C and D and then with fitting 64. Therefore, the pneumatic suspension system is pressurized and the suspension is activated.

The supply of pressure fluid to the pneumatic suspension causes the vehicle frame to be moved away from the wheels and then, by means of a lever 18, cam 14 rotates in order to contact ball 28 and push hollow pushrod 30 against valve 40 to keep the latter open. As the air pressure in the suspension feeding system increases, the vehicle frame or chassis rises thereby rotating cam 14 clockwise so that ball 28 disengages from the profile of greater radius of cam 14 to engage the portion with the profile of smaller radius.

The combined action of spring 42 and the pressurized air of chamber C presses valve 40 against its seat thereby displacing pushrod 30. The closure of valve 40 closes the communication between chambers C and D, whereby the expansion of the suspension elements ceases and the vehicle frame assumes a stable position. In this position pushrod 30 is maintained with the lower end thereof in abutting position against valve 40, thereby avoiding that the air be exhausted (through radial bores 72 and chamber G) from the suspension elements. If the leveller is activated when the suspension system is already pressurized, then the air supplied to chamber C moves piston 34 away and the initially considered movements are repeated; that is, the pushrod 30 is maintained with the lower end thereof in engagement with valve 40, while the latter is engaged with the associated seat to terminate the communication between chambers C and D, and accordingly between fittings 62 and 64.

(b) *Pneumatic system during the changes of the vehicle load*

When the pneumatic suspension system is pressurized, the vehicle is levelled and changes of the vehicle load cause the leveller to be operated. More particularly, as the vehicle load increases, the frame or chassis lowers and cam 14 rotates in a counter-clockwise direction (FIGURE 1). Pushrod 30 is downwardly pressed via cam 14 and pushes valve 40 away from its seat to allow the air flow from fitting 62 to fitting 64 to supply the suspension members through the already-considered circuit.

The air flow continues until the pressure in the suspension is proportional to the vehicle load; after having reached this condition, valve 40, due to the relative movement between casing A and lever 18, and dependent on the relative motion of the vehicle frame, closes again as previously disclosed and pushrod 30 abuts against the face of said valve as already stated.

When, instead, the vehicle load decreases, the frame rises and cam 14 rotates in a clockwise direction and pushrod 30, under the action of the pressure in chamber D acting on valve 40 and eventually also by the action of spring 32, is raised up and pushed away from valve 40 thereby establishing communication between chamber D and atmosphere through bores or ports 68, hollow pushrod 30, bores 72, slots 74, bores 76 and dust-guard 80. Therefore, the pressure of the suspension system is lowered and conformed to the new condition of the vehicle load, while by lowering the frame of said vehicle, the end of pushrod 30 again abuts against valve 40 to terminate the communication between the suspension and the atmosphere.

(c) *Pneumatic system during the running of the vehicle*

During the running of the vehicle, the irregularities on the road pavement cause oscillations of the unsuspended parts of the vehicle, which oscillations are transmitted to the suspended part. In this way, a plurality of changes in the distance between the frame and the unsuspended parts of the vehicle take place with resulting oscillations of cam 14 relative to the neutral position.

If the leveller is activated (and, that is, if the piston 34 is lifted by the air pressure in chamber C), the oscillations of cam 14 cause the opening and closing of valve 40 and the disengagement and re-engagement of the ends of pushrod 30 with said valve 40. In this manner, a pulsating flow of air from fitting 62 to fitting 64 and from fitting 64 to the free atmosphere is established. Once the frame has reached the levelling condition and when the vehicle is at rest, the pressure in chamber C, after the leveller has been deactivated, and since connection 62 is connected with the atmosphere, is annulled and piston 34 is lowered by the action of spring 50 thereby engaging sealing flange 52 against seal 54. The communication, therefore, between chambers C and D is interrupted, while air can be discharged from the suspension system into the atmosphere.

Pushrod 30 remains in the position initially considered whereas ball 28 is disengaged by the outline of cam 14. This condition occurs also when the hollow pushrod 30 remains raised because, upon the first displacement of cam 14 in a counter-clockwise direction, ball 28 is lowered together with the pushrod.

The device according to this embodiment allows the contact between the ball and the cam to be eliminated when the leveller is deactivated, which avoids displacements of the parts and therefore wear and other drawbacks thereof. The deactivation of the leveller when the vehicle is running is convenient because, except for particular cases, the vehicle load cannot vary while running. Load displacements which can occur during the running of the vehicle (as for example, in vehicles used for public service) can be compensated by actuating from time to time the leveller by means of manual controls.

Considering now the embodiment illustrated by FIGURE 3, cam 14a, through a ball 28a, operates the hollow pushrod 30a which slides in a bush 84 integral with body A of the leveller. The sealing between these parts is assured by a gasket 86 conveniently housed in said bush.

A piston 34a the sealing of which is assured by a gasket 48a is slidably mounted inside leveller body A, and has at the lower part thereof a crown or projecting portion 88 cooperating with a gasket 90 retained by a cap 92 secured to said body A in a suitable fashion. Piston 34a is provided with a bore and has a first leveller valve 40a in its interior which cooperates either with the lower end of pushrod 30a or with its seat provided by said piston as stated hereinafter. It is biased by a spring 42a, the free end of which engages with a second valve 94 opposite the first one and which controls the communication between chamber C and fitting 62a through ducts 96 machined in piston 34a.

Piston 34a at its lower part is closed by a bottom element 98 which retains a spring 100 acting thereon. At the other end, said piston has a crown or annular rim 102 pressed, by spring 100 against a gasket 104 which is accommodated against abutment of body A to form the flow control member, which is actuated by the piston and arranged in series to valve 40a controlling the communication between chambers C and D, the latter being defined by a peripheral depression of said piston and the inner wall of cylinder 46a provided in leveller body A. Chamber D is connected by means of a duct 70a with the pneumatic suspension. The hollow pushrod 30a communicates, through radial bores 72a and a duct 78a, with free atmosphere.

The operation of the leveller containing this device is similar to the preceding one.

(A) *Pneumatic system without air or inactive*

When the system is inactive, the leveller members assume the position illustrated in FIGURE 3 and the compressed air flows from the reservoir to the duct 62a in the annular chamber $C_1$ and from this chamber, through the apertures 96, raises the check valve 94 and enters chamber C which is closed by a crown or annular rim 102 against gasket 104.

When the pressure of air in chambers C and $C_1$ reaches a predetermined value, it overcomes the action of spring 100 and displaces piston 34a thereby opening the communication between chamber C, through chamber D, and duct 70a leading to the vehicle pneumatic suspension. The communication with the free atmosphere, through duct 78a is closed due to the engagement of pushrod 30a with valve 40a.

When the pressure in the pneumatic suspension has reached a predetermined value, piston 34a is further displaced against the action of spring 100 until it stops against an abutment 110 in the interior of cap 92; in this condition, the leveller is fully activated. When the air pressure in the pneumatic suspension reaches a value corresponding to the load of the vehicle and when an angular movement of cam 14a in a counter-clockwise direction (FIGURE 3) occurs, said cam allows the lifting of valve 40a of pushrod 30a due to the air pressure in chamber C, in order to close the communication between chamber C and chamber D, whereas the lower end of said pushrod 30a is kept in contact with the face of valve 40a to close the communication with duct 78a, as already mentioned. If the suspension is already pressurized, the supply of compressed air to chamber $C_1$ causes valve 40a to be opened, whereas the other operations remain unchanged.

(B) *Pneumatic system during the changes of vehicle load*

Figure 2:
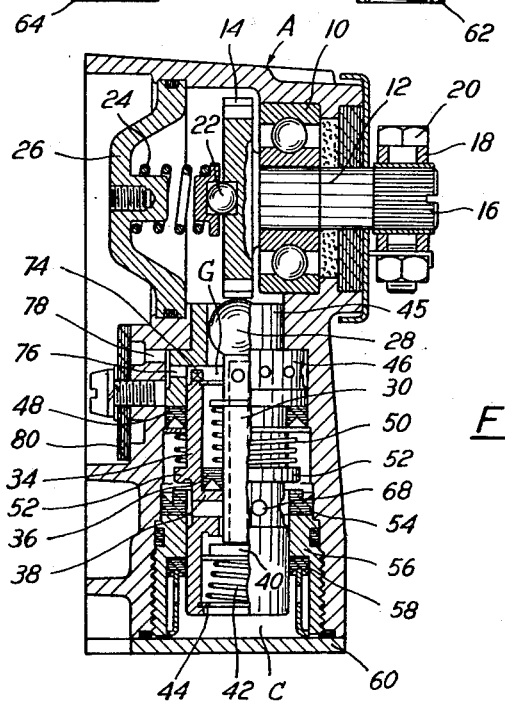

The operation of the device according to FIGURE 3 is similar to that of FIGURES 1 and 2, and when the vehicle load varies, the oscillation or angular rotation of cam 14a establishes the communication either between chambers C and D through valve 40a, or between duct 78a and said chamber D through pushrod 30a and radial bores 72a.

(C) *Pneumatic system during the running of the vehicle*

When the vehicle is running, there are no modifications with respect to the considerations made in the case of the device according to the FIGURES 1 and 2. However, the deactivation of the leveller according to FIGURE 3 is modified. In fact, the deactivation is accomplished by putting into communication duct 62a leading to fitting 27 of FIGURE 1 with the free atmosphere. Therefore, the pressure in chambers C and $C_1$ is relieved, the thrust exerted on piston 34a ceases, and accordingly spring 100 raises said piston 88 to engage crown or annular rim 102 against gasket 104 thereby interrupting the communication between chambers C and D so that the pneumatic suspension is insulated from the pressure generator even if valve 40a is kept open by pushrod 30a when the leveller is deactivated. Of course, however, when the vehicle is running and when the leveller is deactivated, it should not be necessary to effect interruption of the communication between ducts 62a and 70a, but said interruption is useful in the case in which the vehicle frame is subjected to exceptional oscillations due to remarkable irregularities of the road pavement. In such a case, the vehicle frame oscillations generate excess pressure in the pneumatic suspension which can overcome the action exerted by spring 100 on piston 34a thereby causing said piston to be displaced and, therefore, the passage 102–104 to be opened. At any rate, the check valve 94 which is located within piston 34a blocks the communication only in one direction between duct 70a and duct 62a.

When piston 34a is raised by the action of spring 100, hollow pushrod 30a keeps valve 40a away from its seat and said valve closes the opening of said hollow pushrod 30a to block the communication between chamber C and the free atmosphere through ducts 78a.

The stroke of piston 34a is such that hollow pushrod 30a keeps valve 40a open even when ball 28a cooperates with the outline of smaller radius of cam 14a. In this way, said ball 28a is always kept in engagement with the outline of cam 14a even when the leveller is deactivated with the exception that there is air leakage whereby the pressure in chamber C falls below a given limit and, therefore, there occurs the closure of communication between chambers C and D by means of the member 102–104. At any rate, the pressure exerted by ball 28a against cam 14a is slight and not produce significant wear even after a long period of service.

The two embodiments shown in the drawings have various advantages. More particularly, in the device according to FIGURES 1 and 2, hollow pushrod 30, when the leveller is deactivated, is stationary. The device of FIGURE 3 is very simple in construction; however, in both cases a remarkable advantage is obtained according to which the leveller automatically deactives itself when for any reason, there is a breakdown or leakage of the pressure generator and the pressure accordingly falls below a given limit, by assuring, however, in the meantime, sufficient air pressure in order to enable the vehicle to operate, even at a reduced speed, so as to reach a repair shop.

It should be understood that the present invention covers also a leveller which embodies a device in accordance with the invention. Actually, the details of construction and operation could, however, vary without departing from the scope of the invention as defined in the attached claims.

What is claimed is:

1. For controlling the activation of a pneumatic suspension in a vehicle from a source of pressure fluid via a movable suspension leveller: a device having a pushrod adapted for being operated by the suspension leveller for selectively controlling communication between the suspension and the source of pressure fluid and the atmosphere, an improvement in said device comprising a cylinder, a piston slidably mounted in said cylinder, valve means supported in said piston, spring means urging said valve means to a closed position, said pushrod extending in said piston to a position adjacent the valve means for selectively opening the same against the action of said spring means in accordance with operation by said leveller, said piston and cylinder defining a pair of chambers, one of said chambers being adapted for connection with the pneumatic suspension, the other of the chambers being adapted for connection with the source of pressure fluid, said valve means in the closed position blocking communication between the chambers whereby pressure fluid can only flow between said chambers and thereby from the source to the suspension when the valve means is open, and flow control means between said cylinder and piston and controlled by movement of said piston to also control communication between the said chambers, said piston having a first position in which the flow control means is closed and operative to block communication between the chambers, and a second position in which the flow control means is open and provides communication between the chambers, and resilient means between said cylinder and piston urging the latter to a position in which the flow control means is closed.

2. A device as claimed in claim 1 wherein said piston has a seat for the valve means, said valve means being arranged in series with the flow control means such that communication between the chambers is established only when the valve means and the flow control means are both open.

3. A device as claimed in claim 1 wherein the flow control means comprises a gasket in said cylinder and a flange integral with the piston and cooperating with said gasket in the cylinder to selectively contact the same and form a seal therewith.

4. A device as claimed in claim 1 wherein said piston is hollow and includes a seal member for retaining the hollow pushrod so that engagement of said pushrod with the leveller is controlled by the displacement of said piston.

5. A device as claimed in claim 1 wherein said leveller has a body in which the pushrod is slidably supported.

6. A device as claimed in claim 1 wherein the cylinder comprises a bush and a counter-bush which are spaced from each other to define, together with said piston an annular chamber which constitutes said one chamber which is adapted for connection with the pneumatic suspension.

7. A device as claimed in claim 6 wherein the flow control means comprises a gasket on the counter-bush at the upper edge thereof, and a flange integral with the piston and cooperating with said gasket to selectively contact the same and form a seal therewith, said resilient means being a helical spring located between the adjacent edges of the bush and counter-bush and in engagement with said flange to urge the latter against the gasket.

8. A device as claimed in claim 1 wherein said piston is hollow and contains said valve means therein, the device further comprising a check valve in said piston.

9. A device as claimed in claim 1 wherein said device comprises a body constituting said cylinder.

10. A device as claimed in claim 1 wherein the piston comprises at one of the ends thereof a crown which defines an annular chamber constituting said one chamber which is adapted for connection with the pressure source, while said piston comprises at the other of the ends thereof a second crown, said flow control means comprising a gasket supported in said cylinder and a rim on said second crown cooperating with said gasket to selectively contact the same and form a seal.

11. A device as claimed in claim 10 wherein said resilient means is a spring acting on said piston to urge the flow control means to closed position.

References Cited by the Examiner

UNITED STATES PATENTS

| | | | |
|---|---|---|---|
| 1,747,910 | 2/30 | Siefarth | 137—627.5 X |
| 3,011,833 | 12/61 | Stelzer | 303—22 X |
| 3,018,136 | 1/62 | Williams | 303—22 X |
| 3,091,257 | 5/63 | Ballard et al. | |
| 3,094,341 | 6/63 | Alfieri | 137—627.5 |

FOREIGN PATENTS

| | | |
|---|---|---|
| 386,333 | 1/33 | Great Britain. |
| 972,450 | 7/59 | Germany. |

BENJAMIN HERSH, *Primary Examiner.*

ARTHUR L. LA POINT, *Examiner.*